United States Patent Office 3,423,195
Patented Jan. 21, 1969

3,423,195
METHOD OF TREATING ALUMINA ABRASIVE GRAINS WITH IRON NITRATE AND PRODUCTS MADE THEREBY
Israel V. Steinberg, Rochester, N.Y., assignor to American Abrasive Company, Westfield, Mass., a corporation of Massachusetts
No Drawing. Filed May 16, 1966, Ser. No. 550,115
U.S. Cl. 51—295                                    6 Claims
Int. Cl. B24d 3/06

ABSTRACT OF THE DISCLOSURE

Abrasive grains of alumina are heated with 0.1 wt. percent to about 2 wt. percent of iron nitrate at 300° to 700° C. to improve their bonding characteristics in phenolic binders. Further improvement is shown by applying to the treated grains a thin, heat cured coating of vinyl polysiloxane.

---

This invention relates to novel treatments for abrasive grains, to grains so treated, and to abrasive bodies including them, and, more particularly, to novel methods for treating grains of synthetic alumina to prepare them for subsequent bonding with a phenolic resin to form an abrasive body. This application is a companion to applicant's patent application Ser. No. 550,111, filed May 16, 1966, and concurrently herewith and entitled Method of Treating Abrasive Grains and Products Made Thereby.

The use of thermosetting phenolic resins as binders for abrasive bodies is well established. The general techniques for applying phenolic resins to abrasive grains, particularly for the manufacture of rigid abrasive bodies, are described in U.S. Patents Nos. 1,537,454 to Brock; 1,626,246 and its reissue 19,318 to Martin; 1,989,243 to Nash et al.; 2,076,517 to Robie, and 2,878,111 to Daniels et al.

In general, the basic system described in all the aforementioned patents for the manufacture of phenolic resin bonded abrasive bodies is dependent upon wetting the abrasive grains with a wetting agent, which may be either a liquid thermosetting phenol-aldehyde resin or a solvent for phenolic resins such as furfural, or a combination of both. The wetted abrasive grains are then mixed with sufficient powdered thermosetting phenolic resin to form a relatively dry, pourable mix in which the powdered resin is adhesively secured to the abrasive particles by the wetting agent. The dry mix may be hot pressed and cured in molds, or it may be cold pressed to desired shapes, which are then baked, preferably over an extended period and at gradually increasing temperatures to effect hardening of the resin binder to an infusible condition.

The resultant bodies generally meet many commercial service requirements, but there is a demand for abrasive bodies of this type of improved strength and wear characteristics. Heretofore, considerable improvement has been achieved by various different methods such as, for example, by coating the grains with a silicone material before bonding them, as taught by Daniels et al. in Patent No. 2,878,111.

According to the present invention, I have now found that if the grains of alumina are treated with an iron salt before they are bonded, the bodies made of them are stronger and longer wearing than bodies made of untreated grains or of grains treated according to any of several of the prior art methods that I am aware of. In addition, I have found that a further improvement can be achieved by following the salt treatment with any of several different treatments of the prior part.

Briefly, according to the basic process of the invention, the grains of alumina are wetted with an aqueous solution of a ferric salt, typically ferric nitrate, and then heated to about 500° C. to drive off the water and to cause the salt to become converted to iron oxide, which then reacts with or penetrates into the crystal lattice of the alumina. After cooling, the grains are washed to remove any remaining iron salt and loose and soluble reaction products, then dried. They may then be molded to form abrasive bodies of improved strength and wear characteristics, or, alternatively, may be treated by coating them with an organic material such as silane. In the alternate case, the resulting bodies have been found to be somewhat stronger than bodies made of grains that have been simply treated with the iron salt. It has not yet been established, however, that the improvement due to the second treating step is sufficient to justify the extra cost, at least for most utilizations.

The manner in which the treatments of the invention act upon the grains to bring about the observed improvement is not known. It is believed, however, that during the heating step, iron ions replace some of the aluminum ions in the crystal lattice of the alumina or enter the heat-expanded interatomic spaces as inclusion ions. Either or both of these phenomena occur in natural aluminum oxide, which explains why corundum is usually found brown in nature rather than pure white. Since iron (ferric) ions are known to form black complexes very readily with all kinds of phenolic materials, it is a reasonable assumption that the ferric ions at or near the surface of alumina grains can react with the phenolic resin binder to form such complexes. The proof of iron penetration of the lattice lies in the color change of the alumina grains (greyish brown to reddish brown) and to the higher iron content proven by analysis.

The amount of iron salt does not appear to be critical, although for optimum results an amount equal to at least about 1% by weight of the grains should be used. It is applied as a solution to insure thorough and relatively uniform coverage of all the grains. Several times this amount may be used if desired without adverse effect, but also without appreciable further improvement. It is desirable to wash the grains after treatment to remove loose particles of iron oxide, and, in order to minimize the washing required, it is preferred to use the minimum effective quantity of salt.

The time of heating, also, has not been found to be critical. In general, it appears to be necessary only that the entire mass of the wetted grains be heated to some temperature above about 300° C. and held there for only a short time. The time required seems to depend primarily on how long it takes for the heat to penetrate the mass of grains and for all of the solvent to evaporate. To keep the time within reasonable limits, most of the work in reducing the invention to practice included the step of placing the grains for about two and one-half hours in an oven maintained thermostatically at 500° C.

A great deal of physical labor is entailed in testing the effects of changes in each of the large number of variables involved in the practice of the invention, and it has not yet been possible to determine the optimum conditions for the reaction insofar as heating times and temperatures go. All that can be said on the basis of the present work, is that the temperature and time of heating do not appear to be critical, although it is expected that heating at lower temperatures would require longer times both to bring the grains up to temperature and to accomplish the reaction.

In reducing the invention to practice, commercial, synthetic, semi-friable alumina of 46 mesh was used, and the test procedure used to mold the treated grains into shaped bodies and to measure flexural strength of the bodies was as follows:

The ambient humidity was controlled throughout the process at about 50% R.H.

43.8 grams of liquid phenolic resin commercially designated BRL-2534 (available from the Bakelite Corp.) was mixed into a mass of 2144 grams of grains by an ordinary food mixer running for about 3 minutes.

212.2 grams of powdered phenolic resin commercially designated BRP-5417 (Bakelite Corp.) was pre-blended with a small quantity of carbasota oil (furfural, etc.) in a separate container, and to this the grains previously wetted with the liquid resin were added with constant stirring. Stirring was continued for three to four minutes until the mixture appeared to be uniform.

The mixture was then molded into shaped bodies 6″ x 1″ x 1″ by weighing out about 234 grams of the mixture into a mold and pressing in a hand press at about 6,000 to 7,000 p.s.i.

The bars were then cured by placing them in an oven which was pre-heated at 180° F., and programmed to increase in temperature to 360° F. during the next 6 hours. The oven was maintained at 360° F. for 12 hours more and then turned off. The bars were not quenched, but remained in the oven until they cooled to a temperature close to room temperature.

The bars were then tested in a flexural testing machine in which they were supported on supports spaced 5″ apart. Force was applied at the mid-point between the two supports until the bars broke. At least five bars were made for each example and the results averaged to provide a usable relative strength figure.

Using untreated grains, the molded bodies had a flexural strength of about 3800 p.s.i. Using grains treated in accordance with the single stage iron salt treatment of the invention, values were obtained consistently above 4400 p.s.i., and in some cases as high as 5500 p.s.i. The strength figures obtained seemed to vary more in accordance with unknown and uncontrollable factors than in accordance with variations in grain treatment. For example, bars made of one batch of grains showed an average strength of about 4700 p.s.i., while bars made of grains of a different batch treated in exactly the same way showed an average flexural strength of about 5100 p.s.i. In all cases however, the strengths achieved were significantly greater than the strengths of bodies made of untreated grains.

Because of the variations caused by unknown factors, it is difficult to appraise the effects of changes in the conditions of treatment. As to variations in the quantity of the iron salt, a distinct improvement was noted even when only 0.2% of ferric nitrate was used (based on the weight of the grains being treated). Bars made of grains treated with this relatively small quantity of salt had an average flexural strength of 4433 p.s.i. It appears that an amount of 1 wgt. percent ferric nitrate is adequate to optimize the results. Any quantity above this amount is largely superflous and merely makes washing more difficult than otherwise. This is shown by the following tabulation of results achieved using various different quantities of ferric nitrate, heating in each case for 2½ hours at 500° C.:

| Batch No. | Wgt. percent ferric nitrate | Average strength (p.s.i.) |
| --- | --- | --- |
| 1 | 0.2 | 4,433 |
| 1 | 1 | 4,650 |
| 1 | 2 | 4,470 |
| 2 | 0.4 | 4,845 |
| 2 | 1 | 5,100 |
| 2 | 2 | 5,130 |

The following table shows results achieved in an attempt to optimize the times and temperatures of treatment, all the examples being taken from the same batch of grains. In all cases, the bars showed significant improvement relative to bars made of untreated grains (3800 p.s.i.) but not enough data has been accumulated to determine the optimum conditions. The relatively good wet degradation characteristics should be especially noted. In each case, the grains were first wetted with 1 wgt. percent of ferric nitrate in aqueous solution:

TABLE

| Heating Temp. (° C.) | Time (hrs.) | Strength, p.s.i. | | Percent wet degradation |
| --- | --- | --- | --- | --- |
| | | Dry | Wet | |
| 300 | 15 | 4,181 | 3,990 | 4.6 |
| 400 | 4½ | 4,444 | 4,110 | 7.5 |
| 500 | 2½ | 4,425 | 4,148 | 6.3 |
| 600-700 | 1½ | 4,260 | 3,760 | 11.7 |

To determine wet strength of the bars, bars were selected at random and soaked in tap water at room temperature for 3 days before testing.

Still other test bars were made of grains that had been treated by a two-step process. They were first heated with 1 wgt. percent ferric nitrate for 2½ hours at 500° C., washed and dried, and then heated in contact with a silane for 7 hours at 200° C. The silane selected was gamma-aminopropyltriethoxy silane, available commercially under the trade name A-1100. It was applied in solution in an amount equivalent to .0018 mole per 1000 grams of grains and heat cured as described in the above-mentioned Patent No. 2,878,111. After washing and drying, the grains so treated were molded into bars which showed an average flexural strength of 5625 p.s.i.

What is claimed is:

1. Method of treating grains of alumina preparatory to binding them together with a heat hardenable organic resin to form an abrasive body, said method comprising reacting the grains with iron nitrate at an elevated temperature between about 300° and 700° C., and thereafter washing the grains to remove bi-product iron oxide and loose and soluble reaction product therefrom.

2. Method of treating grains of alumina preparatory to bonding them together with a heat hardenable organic resin to form an abrasive body comprising the steps of wetting the grains with a solution of iron nitrate, and then heating the grains so wetted to convert the iron nitrate to iron oxide and to cause the iron oxide so formed to react with surface portions of the grains.

3. Method of treating grains of alumina preparatory to bonding them together with a heat hardenable organic resin to form an abrasive body comprising the steps of wetting the grains with a solution containing at least about 0.1 wgt. percent of iron nitrate based on the total weight of the grains, heating the grains so wetted for 1½ to 15 hours at 700° C. to 300° C.; and thereafter washing the grains to remove loose and soluble matter therefrom.

4. Method according to claim 1 followed by applying to the grains a thin, adherent, heat cured coating of vinyl polysiloxane resin.

5. Alumina abrasive grain treated in accordance with the process of claim 2.

6. A heat-hardened resin bonded abrasive body comprising alumina grains treated according to the process of claim 2.

References Cited

UNITED STATES PATENTS

| | | | |
| --- | --- | --- | --- |
| 1,524,134 | 1/1925 | Hutchins | 51—309.1 |
| 1,618,086 | 2/1927 | Hess | 51—309.1 |
| 1,883,614 | 10/1932 | De Witt | 51—309.1 |
| 1,951,555 | 3/1934 | Masin | 51—309.1 |

DONALD J. ARNOLD, Primary Examiner.

U.S. Cl. X.R.

51—298, 309; 117—100